United States Patent [19]

Russell

[11] 3,898,885

[45] Aug. 12, 1975

[54] TRANSDUCERS

[75] Inventor: Michael Frederick Russell, Ickenham, England

[73] Assignee: C.A.V. Limited, Birmingham, England

[22] Filed: Oct. 15, 1973

[21] Appl. No.: 406,216

[30] Foreign Application Priority Data
Oct. 13, 1972 United Kingdom............... 47335/72

[52] U.S. Cl. ......................... 73/398 AR; 73/119 A
[51] Int. Cl. ............................................. G01l 9/04
[58] Field of Search......... 73/119 I, 398 R, 398 AR, 73/406, 118; 116/34 R

[56] References Cited
UNITED STATES PATENTS

| 3,511,088 | 5/1970 | Weaver | 73/119 I |
| 3,603,152 | 9/1971 | Alibert et al. | 73/398 R |
| 3,698,248 | 10/1972 | Vasek | 73/398 AR |
| 3,698,249 | 10/1972 | Weaver | 73/119 I |

*Primary Examiner*—Donald O. Woodiel
*Attorney, Agent, or Firm*—Holman & Stern

[57] ABSTRACT

A fluid pressure transducer for engagement about a pipe whereby fluid pressure variation within the pipe can be measured, comprises sensing members which define surfaces for engagement with the wall of the pipe at oppositely disposed positions. The sensing members carry sensing elements whereby variation in the stress in the sensing members due to pressure variations in the pipe, is detected. The sensing members are mounted on arms which are pivotally mounted so as to permit engagement of the sensing members with the pipe. The arms have frictional engagement with a pair of plates and this provides damping of the movement of the members due to variations in the diameter of the pipe.

10 Claims, 13 Drawing Figures

3,898,885

TRANSDUCERS

This invention relates to fluid pressure transducers for mounting upon a fluid conveying pipe, the transducer providing an electric measure of the fluid pressure within the pipe by sensing the dilation of the wall of the pipe.

The object of the invention is to provide such transducers in a simple and convenient form.

A fluid pressure transducer in accordance with the invention comprises a body portion, at least a pair of members having surfaces engageable with the wall of the pipe, said pair of members being adjustably mounted so as to permit engagement of the surfaces with the wall of the pipe, the body portion including further members which frictionally engage said first mentioned members to damp the movement thereof as the diameter of the pipe varies with variation of the fluid pressure therein, and also movement of the members stimulated by vibration of the pipe, and sensing elements activated by movement of said surfaces.

Figure 1:
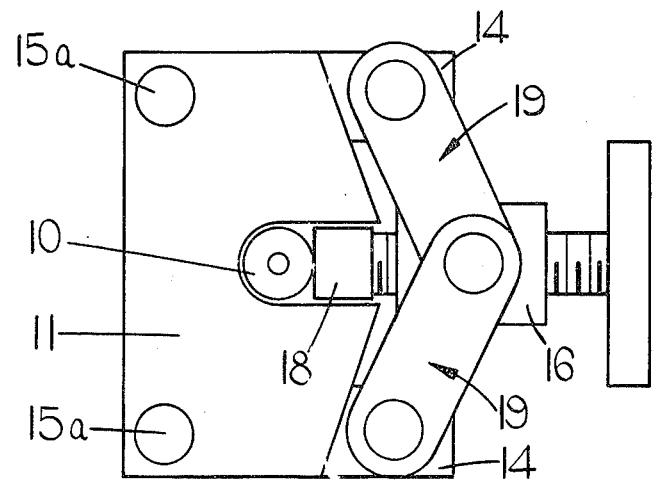
Figure 2:
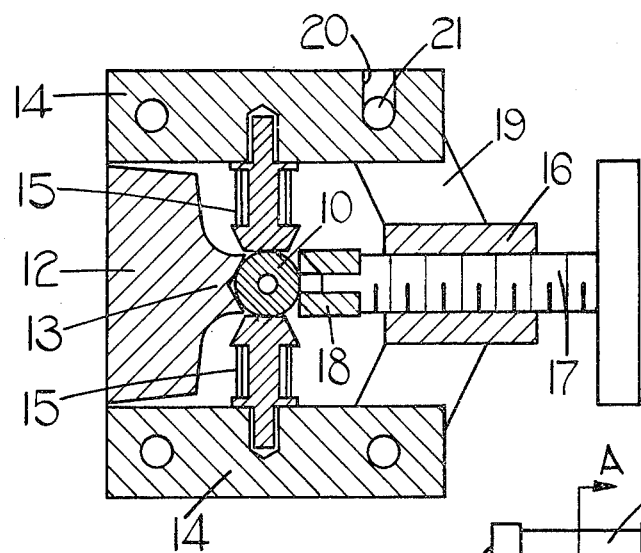
Figure 3:
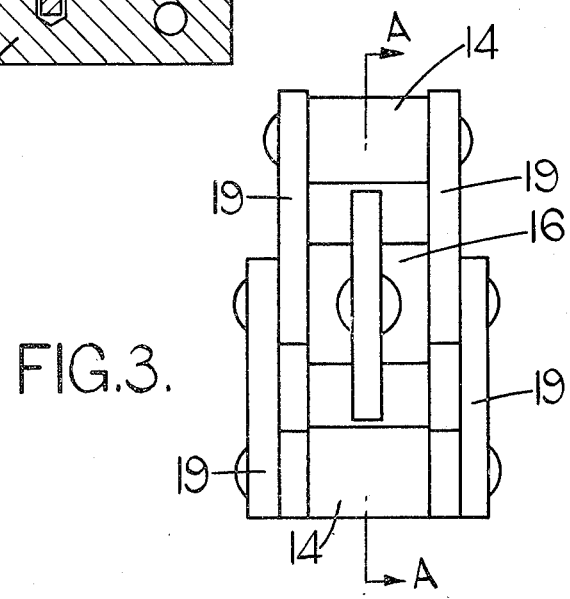
Figure 4:
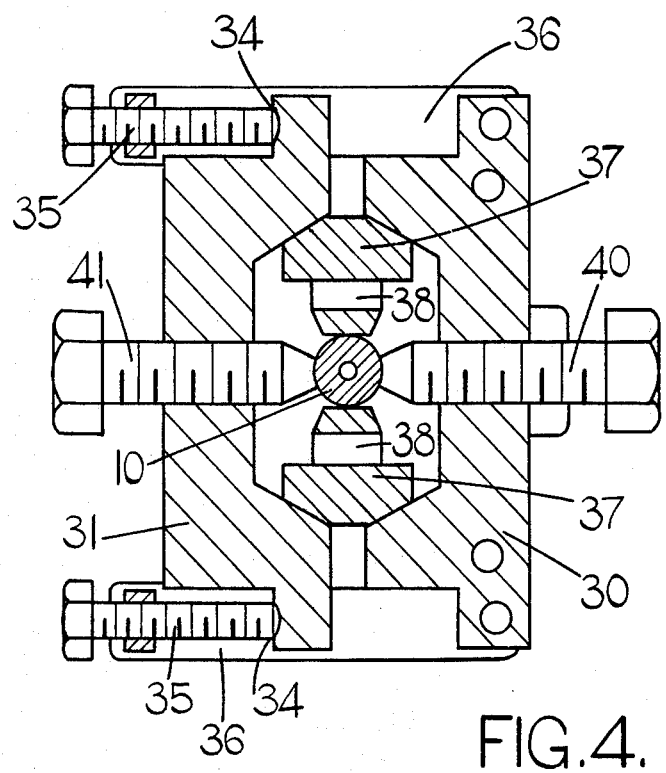
Figure 5:
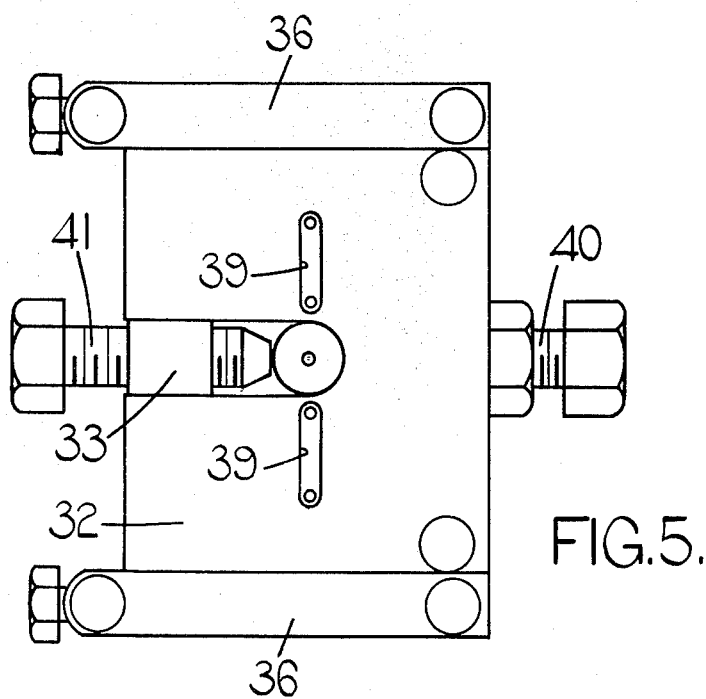
Figure 6:
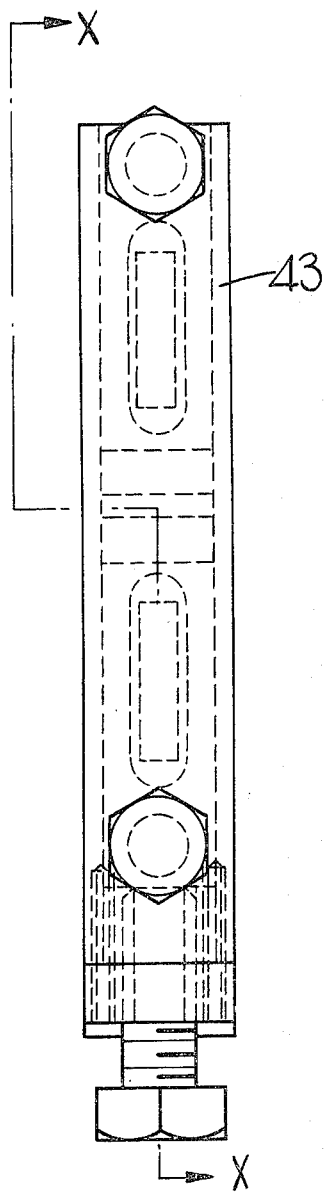
Figure 7:
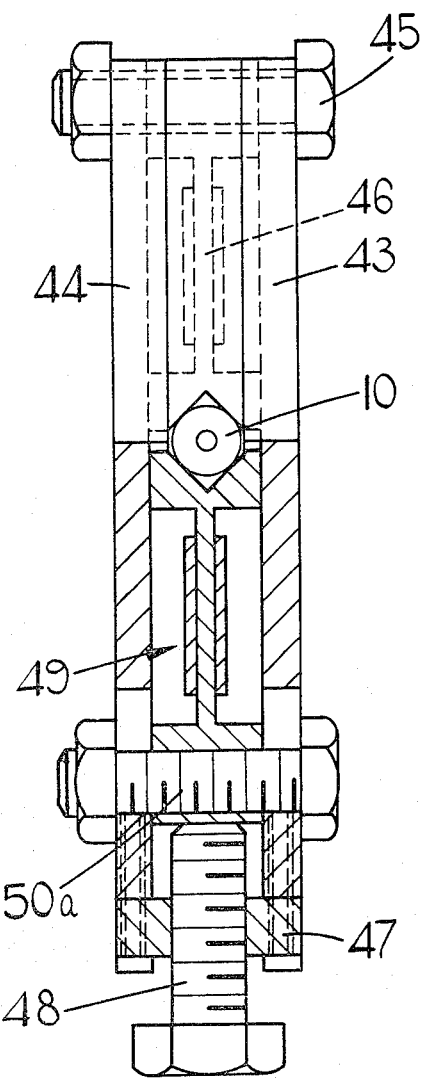
Figure 8:
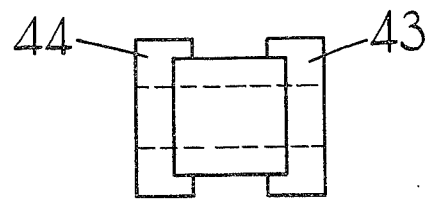
Figure 9:
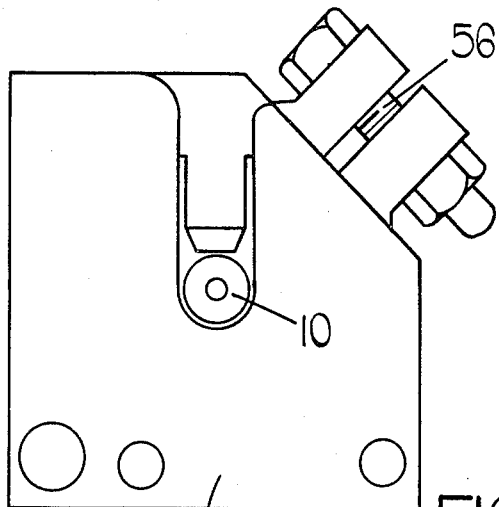
Figure 12:
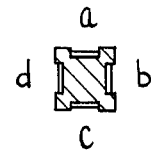
Figure 10:
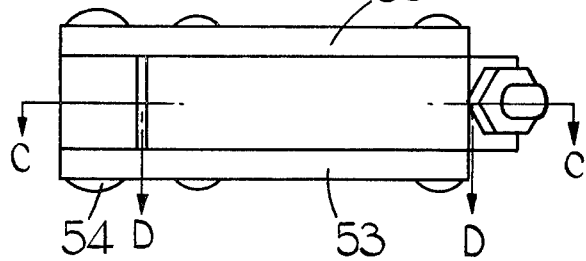
Figures 11, 13:
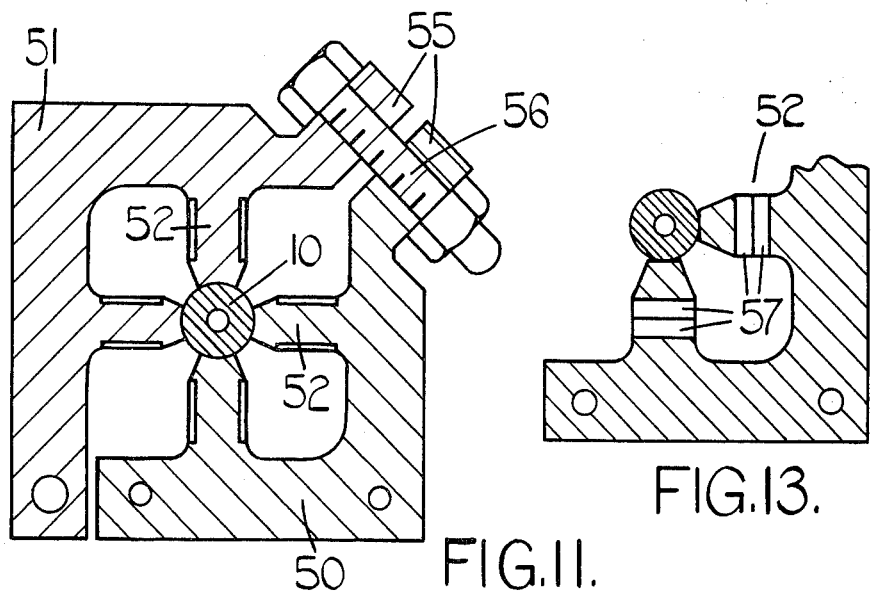

Examples of transducers in accordance with the invention will now be described with reference to the accompanying drawings in which:

FIG. 1 is a side view of a transducer,

FIG. 2 is a sectional side view of the transducer of FIG. 1 taken on the line A—A of FIG. 3, FIG. 3 is an end view of the transducer of FIG. 1, FIG. 4 is a sectional side elevation of another example of a transducer, FIG. 5 is a side view of the transducer of FIG. 4, FIG. 6 is a side view of a further transducer, FIG. 7 is an end view partly in section of the transducer of FIG. 6 along the line X—X of FIG. 6, FIG. 8 is a plan view of the transducer of FIGS. 6 and 7 with parts removed for the sake of clarity, FIG. 9 is a side view of a further transducer, FIG. 10 is a plan view of the transducer of FIG. 9, FIG. 11 is a section on the line CC of FIG. 10, FIG. 12 is a section on the line EE of FIG. 11, and FIG. 13 is a part section on the line DD of FIG. 10.

With reference to FIGS. 1, 2 and 3 the transducer is shown mounted about a pipe 10 which conveys fluid in this case liquid fuel, under pressure. The transducer comprises a pair of side plates 11 which are disposed in spaced parallel relationship and which are secured to opposite sides of support member 12. The support plates are cut away to define recesses for the pipe 10 and the support member is shaped to provide a pressure pad having a pipe engaging surface 13 of V form.

Also provided are a pair of hinged side members 14 which are connected by pivot pins 15a to the side plates 11. The side members pass between the side plates 11 and each carries a sensing member 15 which extends inwardly towards the pipe. The sensing members are resilient in nature and associated with each member is an electrical sensing element such as a piezo electric element which will produce an output signal when the associated sensing member is subject to stress. Alternatively the sensing element may be of the piezo resistive type in which case a variation in electrical resistance occurs as the sensing member is stressed.

The sensing members are held in contact with the wall of the pipe 10 by means of a toggle linkage which comprises a central block 16 having a threaded aperture in which is mounted a manually adjustable rod 17 which carries a pressure pad 18 for engagement with the pipe. The block 16 is pivotally connected to on opposite sides respectively, a pair of links 19. The outer link of each pair of links is pivotally connected to one of the side members 14. For this purpose and as is seen in FIG. 2, the upper side member is provided with an entrance slot 20 to receive a pin 21 connecting the ends of the aforesaid links 19.

In operation the pin 21 is disengaged from the slot 20 to permit the transducer to be mounted about the pipe after which the pin 21 is positioned in the slot 20 and the pressure pad tightened onto the pipe. This has the effect of drawing the surfaces 13 and the sensing member 15 onto the peripheral surface of the pipe. Any variation in the fluid pressure within the pipe will cause variation in the external dimension of the pipe and this will be sensed by the sensing member and an electrical signal will be obtained from the sensing elements. The sensing elements can be electrically connected together so that signals due to vibration of the pipe in the vertical plane will cancel out. Vibration of the pipe in the horizontal plane will have no effect since the transducer is rigidly clamped to the pipe. Moreover, damping is provided by reason of the sensing members having rubbing engagement with the side plates.

With reference now to FIGS. 4 and 5, the transducer comprises first and second body members 30, 31 which are shaped to define a cavity through which the pipe 10 can extend. The body member 30 has rigidly connected thereon and on opposite sides thereof, a pair of side plates 32 each of which are slotted to provide for access for the pipe. In addition, the slots serve as guides for a pair of ears 33 fused on the second body portion.

The second body portion 31 defines a pair of outwardly extending ledges 34 for engagement by a pair of set screws 35 respectively carried by a pair of spring clamp members 36 respectively. The clamp members are pivotally mounted upon the first body member 30 and the arrangement is such that tightening of the screws 35 will effect movement of the body members towards each other. The screws are pre-adjusted so that the spring clamp members exert a constant force between the body members. Located within the cavity are a pair of wedge members 37 which carry sensing elements 38 of the piezo electric type. The sensing elements 38 carry pressure pads for engagement with the pipe. The wedge members are provided with inclined rear faces for engagement with complementary faces on the body members respectively and in addition each wedge member is provided with lateral pins which are located within slots 39 formed in the side plate 32.

In operation, the pipe is inserted by separating the body members after which the body members are repositioned and the spring clamps 36 sprung into place. As the body members move towards each other, the wedge members 37 because of the action of the inclined faces, are urged towards the pipe and the pressure pads engage with the surface of the pipe. The force exerted on the pipe is determined by the spring clamps 36. Moreover, the body members 30, 31 carry set screws 40, 41 which are engaged with the surface of the pipe, the lines of action of the set screws being at right angles to the lines of action of the wedge members 38. As in the previous example the set screws 40, 41 rigidly clamp the transducer to the pipe and damping is provided by the side plates. In cases of severe vibration where the force exerted by the spring clamps may not be sufficient the clamps may be rigid so that a rigid fixing is provided.

With reference now to FIGS. 6, 7 and 8 the transducer comprises a pair of channel members 43, 44 and at one end the members are interconnected by a bolt 45. The bolt 45 also locates one end of a sensing member 46 which comprises a central reduced portion disposed between blocks one of the blocks being apertured to receive the bolt 45 and the other block being provided with a recess of V section. The reduced portion is provided with piezo-electric slips or piezo resistive gauges. At the other end a block 47 is secured to the ends of the channel members by screws. The block is provided with a screwed aperture which receives a screw threaded adjusting bolt 48 and the bolts bears upon one end of a block forming part of a further sensing member 49. The aforesaid block is apertured to receive a bolt 50a serving to secure the channel members together and the bolt 50a is located in slots formed in the base walls of the channel member. The construction of the sensing member 49 is the same as that of the sensing member 46 and when the pipe 10 is positioned between the recessed blocks it is contacted at four points. In this manner variation of pipe diameter due to fluid pressure variation therein provide stressing of the sensing members and a resulting signal from the sensing elements. As in the previous examples signals due to vibration of the pipe in the plane of the reduced portions of the members are electrically cancelled.

Damping is achieved by making the sensing members 46, 49 with a slight taper so that friction exists between the members and the walls of the channels over the whole length of the sensing members. The clamping force on the pipe is determined by the setting of the screw 48.

With reference now to FIGS. 9, 10, 11 and 12 the transducer shown therein comprises a pair of body members 50, 51 each of which are substantially L shaped and each having a pair of sensing members 52 formed integrally therewith. The sensing members are disposed on the inner sides of the limbs respectively and are of substantially square cross section as seen in FIG. 12. Moreover, each sensing member is provided on its four sides with four piezo electric or piezo resistive sensing elements which are connected together so that in use signals produced by vibration of the pipe in any way are electrically cancelled out.

The body member 50 carries on its opposite sides respectively a pair of side plates 53. The side plates are provided with slots to provide clearance for the pipe 10 and the plates carry a pivot pin 54 by which the body portion 51 is hingedly connected to the plates and the other body portion. Moreover, each body member carries clamp elements 55 through which extends a pinch bolt 56. The pinch bolt is removed to enable the transducer to be engaged around the pipe and the pinch bolt is replaced and tightened to bring the sensing members into engagement with the pipe. Vibration of the pipe in all directions is cancelled electrically but if axial vibration of the pipe is not severe then the piezo elements located on the sides of the sensing members 52 presented to the side plates 53 may be omitted. An alternative arrangement is shown in FIG. 13 in which the sensing members 52 incorporate piezo-electric discs 57 arranged in pairs and with cancelled cross axes. Damping is achieved by frictional engagement of the body members with the side plate.

Further damping may be achieved by making the whole or part of the clamp elements 55 of laminated construction.

I claim:

1. A fluid pressure transducer comprising a body portion, at least a pair of members having surfaces engageable with the wall of a pipe, said pair of members being adjustably mounted so as to permit engagement of said surfaces with the wall of the pipe, said body portion including a pair of spaced side plates, said members being positioned intermediate said plates, said plates frictionally engaging said members and acting to damp movement thereof as the diameter of the pipe varies with variation of the fluid pressure therein, portions of said members being of reduced section so as to be distorted by the pressure variations in the pipe and sensing elements mounted on said reduced portions of said members.

2. A transducer as claimed in claim 1 in which said members comprise a pair of arms hinged at one end relative to said plates, said arms carrying a pair of deformable elements defining said surfaces, means being provided for urging said surfaces into engagement with the wall of said pipe.

3. A transducer as claimed in claim 2 in which said means includes a toggle linkage.

4. A transducer as claimed in claim 1 including a pair of pressure pads for engagement with the wall of the pipe, one of said pressure pads being defined on a body portion disposed intermediate the side plates and the other pressure pad being defined at the end of an adjusting screw forming part of said toggle linkage, said pressure pads being engageable with the pipe to prevent lateral displacement of the transducer along the length of the pipe, the sensing elements being mounted and electrically connected so that electrical signals produced due to vibration of the pipe in the direction of the longitudinal axes of the deformable elements are cancelled.

5. A transducer as claimed in claim 2 in which each arm is provided with a pair of said members, the members on one arm engaging with the pipe at positions spaced approximately 90° about the longitudinal axis of the pipe, each of said members mounting sensing elements which are electrically connected so that signals arising due to vibration of the pipe are cancelled out.

6. A transducer as claimed in claim 5 including means acting between the arms to move said arms so that the surfaces on said first mentioned members are urged into engagement with the wall of said pipe.

7. A transducer as claimed in claim 5 in which said members are of substantially square section, four sensing elements being provided on each of said members, said elements being positioned on the sides respectively of the members.

8. A transducer as claimed in claim 1 in which said pair of members are slidably mounted intermediate said plates, there being also provided a pair of body members positioned between said plates, one of said body members being secured to the plates, clip means for urging the body members towards each other and co-operating surfaces on said body members and said pair of members whereby when the clip means is operated said pair of members will be moved so that said surfaces will engage with the wall of the pipe.

9. A transducer as claimed in claim 8 including screw means on said body portions for engagement with the wall of the pipe to secure the transducer against movement lengthwise of the pipe.

10. A transducer as claimed in claim 1 in which said side plates are of channel form said members being located intermediate the walls of the channels.

* * * * *